(12) United States Patent
Kawai et al.

(10) Patent No.: US 7,826,462 B2
(45) Date of Patent: Nov. 2, 2010

(54) ADDRESS ASSIGNMENT APPARATUS, ADDRESS ASSIGNMENT METHOD, AND COMPUTER PRODUCT

(75) Inventors: Morihisa Kawai, Kawasaki (JP); Takeshi Saito, Kawasaki (JP); Satoru Chikuma, Kawasaki (JP); Ikuo Takekawa, Kawasaki (JP); Teruhiko Onishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 66 days.

(21) Appl. No.: 12/138,682

(22) Filed: Jun. 13, 2008
(Under 37 CFR 1.47)

(65) Prior Publication Data
US 2009/0034539 A1    Feb. 5, 2009

Related U.S. Application Data

(63) Continuation of application No. PCT/JP2005/023399, filed on Dec. 20, 2005.

(51) Int. Cl.
*H04L 12/28* (2006.01)
(52) U.S. Cl. ...................................... 370/400
(58) Field of Classification Search .................. 370/400
See application file for complete search history.

(56) References Cited

U.S. PATENT DOCUMENTS 6,118,771 A * 9/2000 Tajika et al. ................. 370/328

| | | | |
|---|---|---|---|
| 2003/0100343 A1* | 5/2003 | Zourntos et al. | 455/562 |
| 2004/0174904 A1* | 9/2004 | Kim et al. | 370/475 |
| 2004/0240474 A1* | 12/2004 | Fan | 370/475 |
| 2005/0007962 A1* | 1/2005 | Nam et al. | 370/252 |
| 2006/0235997 A1* | 10/2006 | Munirajan et al. | 709/245 |

FOREIGN PATENT DOCUMENTS

| JP | A 50-57105 | 5/1975 |
|---|---|---|
| JP | A 9-252316 | 9/1997 |
| JP | A 2004-274750 | 9/2004 |
| JP | A 2005-012761 | 1/2005 |

* cited by examiner

*Primary Examiner*—Ayaz R Sheikh
*Assistant Examiner*—Hai-Chang Hsiung
(74) *Attorney, Agent, or Firm*—Greer, Burns & Crain, Ltd.

(57) ABSTRACT

Upon receipt of a request to connect to an ad-hoc network from an external communication node, an address assigning unit obtains information on an IP address assigned to the external communication node. The address assigning unit determines whether the IP address is already used by any of communication nodes that are connected to the ad-hoc network based on network management information stored in a storage unit. The address assigning unit generates a new IP address that is used none of the communication nodes when the IP address is already used, and transmits the new IP address to the external communication node. The external communication node is assigned the new IP address, and connects to the ad-hoc network.

6 Claims, 17 Drawing Sheets

FIG.6

| PACKET ID | MAC ADDRESS | IP ADDRESS |
|---|---|---|
| 00011 | C | a |

CONNECTION PACKET

| MAC ADDRESS | IP ADDRESS |
|---|---|
| A | c |
| B | b |
| C | d |

| MAC ADDRESS | IP ADDRESS |
|---|---|
| C | a |

FIG.18

| MAC ADDRESS | IP ADDRESS | URL | REAL ADDRESS | VIRTUAL ADDRESS |
|---|---|---|---|---|
| A | a | urlA1 | aa | vaa |
| | | urlA2 | | |
| | | urlA3 | ab | vab |
| B | b | urlB1 | ab | vac |

FIG.19

| MAC ADDRESS | IP ADDRESS | URL | REAL ADDRESS |
|---|---|---|---|
| A | a | urlA1 | aa |
| | | urlA2 | |
| | | urlA3 | ab |
| B | b | urlB1 | ab |

FIG.20

| MAC ADDRESS | IP ADDRESS | URL | REAL ADDRESS | VIRTUAL ADDRESS |
|---|---|---|---|---|
| A | a | urlA1 | aa | vaa' |
| | | urlA2 | | |
| | | urlA3 | ab | vab' |
| B | b | urlB1 | ab | vac' |

ADDRESS ASSIGNMENT APPARATUS, ADDRESS ASSIGNMENT METHOD, AND COMPUTER PRODUCT

This application is a Continuation of International PCT Application No. PCT/JP2005/023399 filed Dec. 20, 2005.

BACKGROUND OF THE INVENTION

1. Field of the Invention

The present invention relates to a technology for assigning an address to a communication node.

2. Description of the Related Art

Recently, an ad-hoc network has been utilized that can establish data communications between a plurality of communication nodes without infrastructure.

However, in the ad-hoc network environment, a network is configured without infrastructure. Thus, a protocol for automatic Internet Protocol (IP) address assignment such as a dynamic host configuration protocol (DHCP) on a wired network cannot be used.

Therefore, a communication node connected to the ad-hoc network needs to set as its own IP address an address that is not used by other communication nodes connected to the ad-hoc network.

Japanese Patent Application Laid-open Nos. 2004-274750 and 2005-12761 disclose conventional technologies in which a communication node periodically transmits information on its IP address to other communication nodes that constitute an ad-hoc network. Upon receipt of the information, each of the communication nodes determines whether the IP address is coincident with its own IP address. When the IP addresses are coincident, the communication node sets a new IP address, and transmits the new IP address to other communication nodes. Accordingly, duplicate use of the same IP addresses by communication nodes is prevented.

In the conventional technologies, however, an IP address cannot be efficiently assigned to a communication node connected to the ad-hoc network. It takes some time before data communications is initiated between communication nodes.

Specifically, in the process of detecting duplicate use of the same IP address and reassigning a new IP address, it may occur that the new IP address is also used by another communication node. When a plurality of communication nodes are connected to the ad-hoc network, it is highly likely that the communication nodes are assigned the same IP address. This results in the repetition of a series of operations: assignment, detection, and reassignment, until an IP address used by none of the communication nodes is assigned.

SUMMARY

It is an object of the present invention to at least partially solve the problems in the conventional technology.

According to an aspect of the present invention, there is provided an address assignment apparatus that assigns an address to a communication node that constitutes an ad-hoc network. The address assignment apparatus includes a storage unit that stores therein address management information indicating addresses assigned to existing communication nodes in the ad-hoc network; a determining unit that, upon receipt of a request to connect to the ad-hoc network from an external communication node, obtains information on an address assigned to the external communication node, and determines whether the address is already used by any of the existing communication nodes based on the address management information; and an assignment unit that, when the address is already used, generates a new address not used by the existing communication nodes, and assigns the new address to the external communication node.

According to another aspect of the present invention, there is provided an address assignment method for assigning an address to a communication node that constitutes an ad-hoc network. The address assignment method includes storing address management information indicating addresses assigned to existing communication nodes in the ad-hoc network; obtaining, upon receipt of a request to connect the ad-hoc network from an external communication node, information on an address assigned to the external communication node; determining whether the address is already used by any of the existing communication nodes based on the address management information; generating, when the address is already used, a new address not used by the existing communication nodes; and assigning the new address to the external communication node.

According to still another aspect of the present invention, there is provided a computer-readable recording medium that stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an example of a connection packet;

FIG. 7 is an example of contents of the network management information after information is updated/added;

FIG. 18 an example of contents of network management information shown in FIG. 17;

FIG. 19 an example of contents of network management information shared by communication nodes connected to the ad-hoc network shown in FIG. 16;

FIG. 20 an example of contents of network management information stored in another communication node shown in FIG. 16;

DETAILED DESCRIPTION OF THE PREFERRED EMBODIMENTS

Exemplary embodiments of the present invention are explained in detail below with reference to the accompanying drawings.

According to an embodiment of the present invention, communication nodes that participate in an ad-hoc network (a network that does not require a device like a wireless local area network (LAN) access point, and is configured only with terminals that are capable of wireless connection such as a personal computer, a personal digital assistant (PDA), and a cellular phone) each retain information on IP addresses assigned to the communication nodes that constitute the ad-hoc network. When one of the communication nodes receives a request to connect the ad-hoc network (hereinafter, "connection request") from an external communication node having an already existing IP address (the same IP address as an IP address of any of the communication nodes that constitute the ad-hoc network), the communication node that has received the connection request generates a new IP address that is not assigned to any other communication nodes. The communication node then notifies the external communication node of the new IP address to instruct it to change the IP address. The communication node also notifies the other communication nodes of the new IP address.

As described above, each of communication nodes in an ad-hoc network retains information on IP addresses assigned to all communication nodes that constitute the ad-hoc network (hereinafter, "address management information"). Upon receipt of a connection request from an external node, a communication node generates an IP address that is not assigned to any other communication nodes based on the address management information, and assigns the IP address to the external communication node. Thus, an IP address can be efficiently assigned to a communication node that newly participates in the ad-hoc network, which prevents duplicate use of the same IP address.

Figure 1:
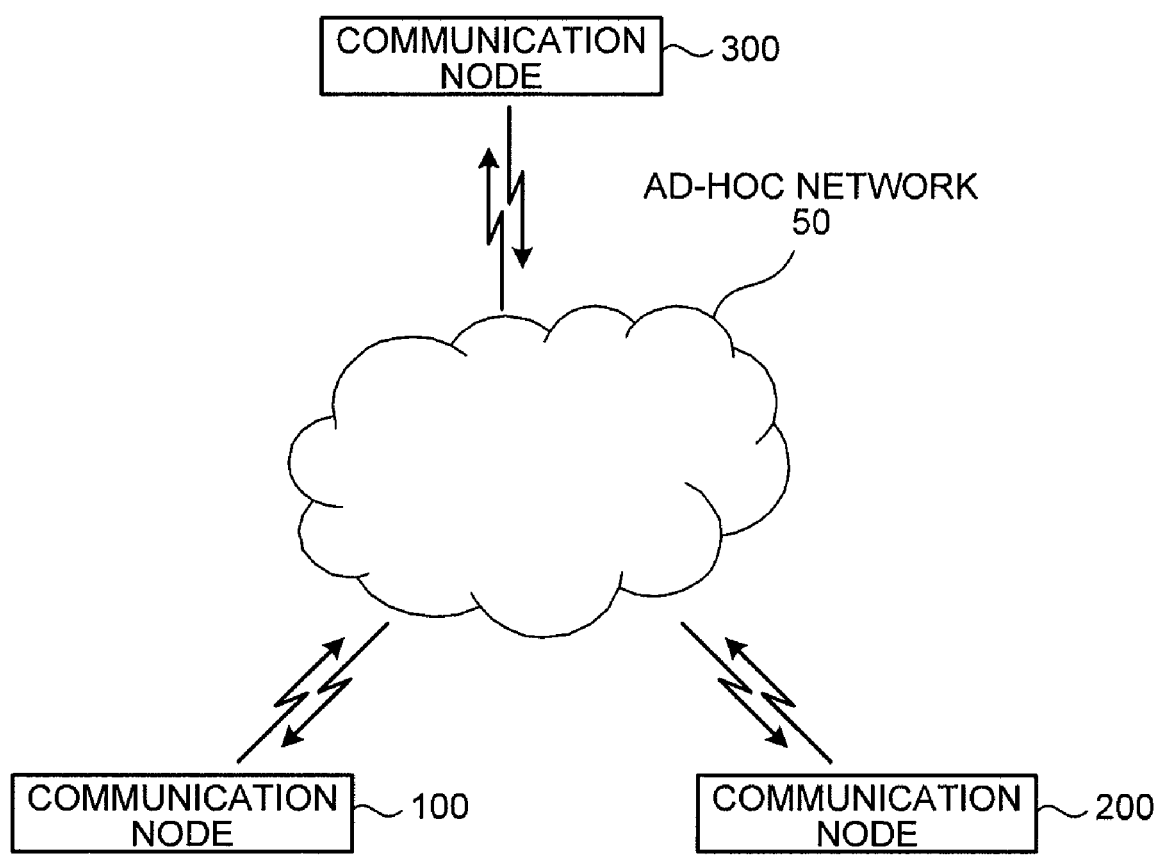
FIG. 1 is a schematic diagram of an ad-hoc network according to a first embodiment of the present invention.

FIG. 1 is a schematic diagram of an ad-hoc network 50 according to a first embodiment of the present invention. The ad-hoc network 50 includes communication nodes 100 to 300. Although three communication nodes (100 to 300) are shown for convenience of illustration, the ad-hoc network 50 can include an arbitrary number of communication nodes.

The communication nodes 100 to 300 perform data communication with one another. The communication nodes 100 to 300 are of like configuration and operate in a similar manner, and thus but one of them, for example, the communication node 100 is explained in detail below.

Figure 2:
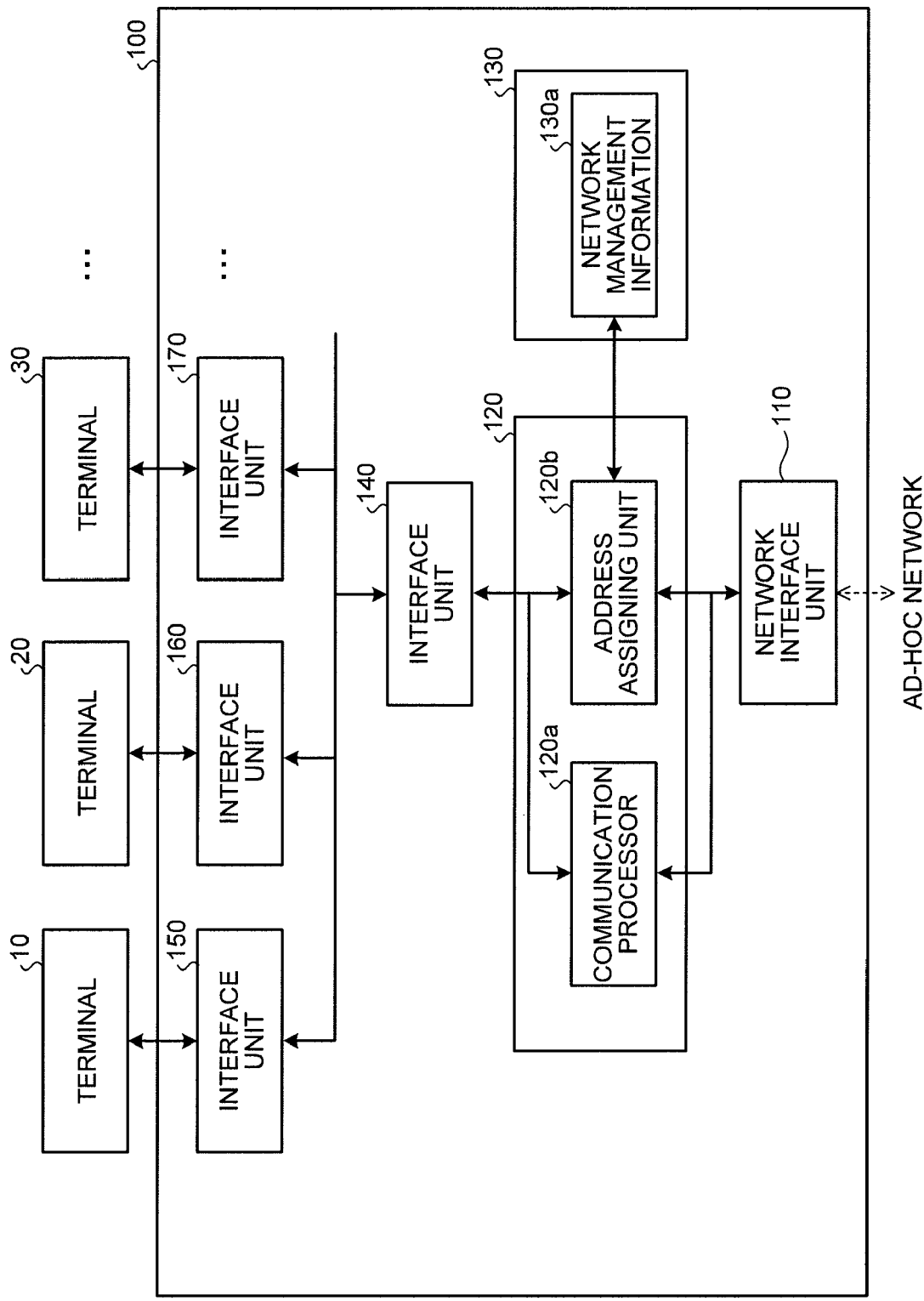
FIG. 2 is a functional block diagram of a communication node shown in FIG. 1.

FIG. 2 is a functional block diagram of the communication node 100. The communication node 100 includes a network interface unit 110, a controller 120, a storage unit 130, and an interface units 140 to 170.

The network interface unit 110 establishes communications with other communication nodes (e.g., the communication nodes 200 and 300) using a predetermined communication protocol. The interface unit 140 establishes communications with terminals 10 to 30 connected to the communication node 100 using a predetermined communication protocol. The interface units 150 to 170 connect the terminals. Although three interface units (150 to 170), and three terminals (10 to 30) are shown for convenience of illustration, the communication node 100 can include an arbitrary number of interface units, and can be connected to an arbitrary number of terminals.

The controller 120 assigns an IP address to each of the communication nodes that constitute the ad-hoc network 50 to prevent duplication of the IP addresses of the communication nodes. The controller 120 includes a communication processor 120a and an address assigning unit 120b.

The communication processor 120a provides data communications among the terminals 10 to 30 connected to the interface units 150 to 170, and terminals connected to other communication nodes that are connected to the ad-hoc network 50.

When receiving a connection request to the ad-hoc network 50 from an external communication node (communication node that is not connected to the ad-hoc network 50), the address assigning unit 120b obtains information of an IP address assigned to the external communication node. The address assigning unit 120b determines whether the IP address has already been assigned to any of the communication nodes that constitute the ad-hoc network 50 based on network management information 130a stored in the storage unit 130. When the IP address has already been assigned, the address assigning unit 120b generates a new IP address that is not assigned to other communication nodes. The address assigning unit 120b transmits the new IP address to the external communication node, and the communication nodes that constitute the ad-hoc network 50. In this manner, the address assigning unit 120b assigns an IP address to a communication node that newly participates in the ad-hoc network for configuring a new ad-hoc network.

Figure 3:
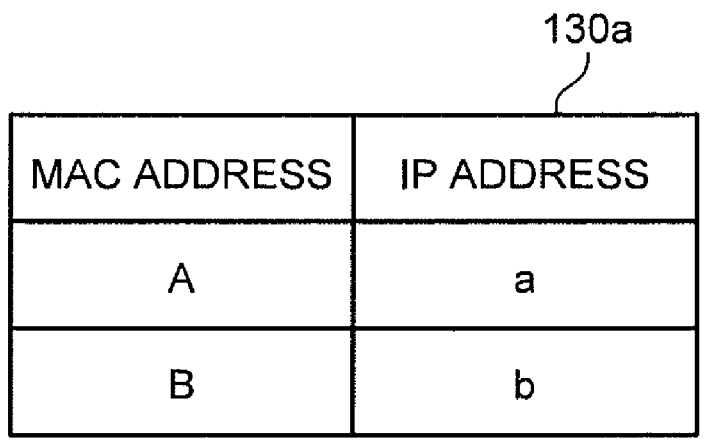
FIG. 3 is an example of contents of network management information shown in FIG. 2.

The storage unit 130 stores therein the network management information 130a. The network management information 130a includes information on the IP addresses assigned to the communication nodes that constitute the ad-hoc network 50 and information of media access control (MAC) addresses of the communication nodes. FIG. 3 is an example of contents of the network management information 130a.

As shown in FIG. 3, the network management information 130a includes items of MAC address and IP address (it is assumed in FIG. 3 that the ad-hoc network 50 includes the communication nodes 100 and 200). The MAC address is uniquely assigned to all communication nodes connected to the network, so that they can be identified by the MAC address.

Specifically, in FIG. 3, IP address "a" is assigned to a communication node (e.g., the communication node 100) assigned MAC address "A", and IP address "b" is assigned to a communication node assigned MAC address "B".

Returning to the explanations of the address assigning unit 120b, the address assigning unit 120b periodically generates a publication packet, and transmits the packet. The publication packet includes an ID (hereinafter, "packet ID") for uniquely identifying the publication packet, and the network management information 130a.

Figure 4:
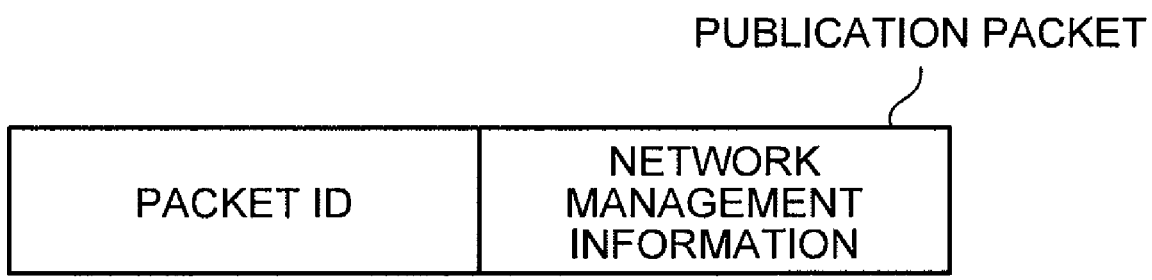
FIG. 4 is an example of a publication packet.

The address assigning unit 120b substitutes the MAC address of the communication node 100 and information of a date and time when the publication packet is generated for an arbitrary function (any function can be employed) to generates a packet ID. FIG. 4 is an example of the publication packet. The address assigning unit 120b temporarily holds the generated packet ID, and updates the packet ID each time a new packet ID is generated. The packet ID held in the address assigning unit 120b is hereinafter referred to as a held packet ID.

When receiving a publication packet from another communication node that approaches the ad-hoc network 50, the address assigning unit 120b compares a packet ID included in the received publication packet and the held packet ID. When the held packet ID is larger (held packet ID>packet ID received from the another communication node), the address assigning unit 120b updates the network management information 130b stored in the storage unit 130 based on network management information included in the publication packet received from the another communication node.

Figure 5:
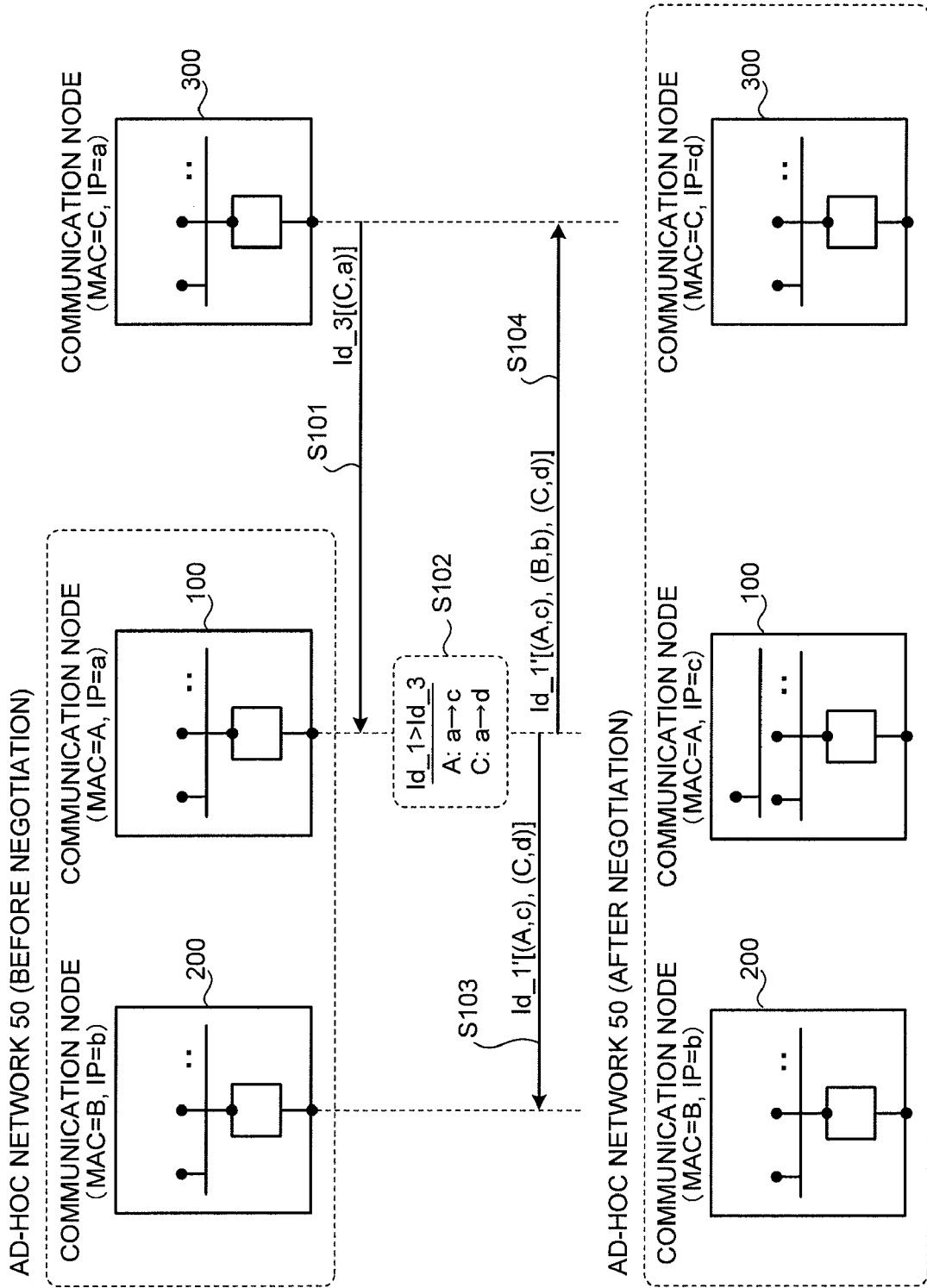
FIG. 5 is a sequence diagram of an address-assignment process performed by an address-assignment unit shown in FIG. 2.

FIG. 5 is a sequence diagram of an address-assignment process performed by the address assigning unit 120b. It is herein assumed that the communication nodes 100 and 200 constitute the ad-hoc network 50, the communication node 300 is newly connected to the ad-hoc network 50, and the communication node 100 assigns an IP address to the communication node 300.

As shown in FIG. 5, the communication node 300 publicizes a packet ID, and an MAC address and an IP address thereof, i.e., transmits a packet (hereinafter, "connection packet") (step S101). FIG. 6 is an example of the connection packet transmitted from the communication node 300 to the communication node 100 at step S101.

Upon receipt of the connection packet from the communication node 300, the communication node 100 compares the packet ID included in the connection packet and the held packet ID. When the held packet ID is larger, the communication node 100 determines whether the IP address is already used based on the network management information 130a and the connection packet.

In the examples of the network management information 130a shown in FIG. 3 and the connection packet shown in FIG. 6, the IP address "a" of the MAC address "A" and the MAC address "C" is duplicated. The address assigning unit 120b replaces each IP address with another, i.e., an IP address that is not used (step S102). For example, the IP address "a" of the MAC address "A" is replaced with "c", and the IP address "a" of the MAC address "C" is replaced with "d".

The address assigning unit 120b then updates the network management information 130a in response to the replacement of IP address, and adds the information of the MAC address and the IP address of the communication node 300 to the network management information 130a. FIG. 7 is an example of contents of the network management information 130a after the information is updated/added.

In the network management information 130a shown in FIG. 7, as compared to that shown in FIG. 3, the IP address "a" of the MAC address "A" is replaced with "c", and the information of the MAC address and IP address of the communication node 300 is added.

The address assigning unit 120b then transmits the information of the replacing IP address and the information (MAC address and IP address) of the newly added communication node (the communication node 300) to other communication nodes (the communication node 200) that constitute the ad-hoc network 50. Thus, the communication node 200 updates the network management information as shown in FIG. 7 (step S103).

Figures 8, 9:
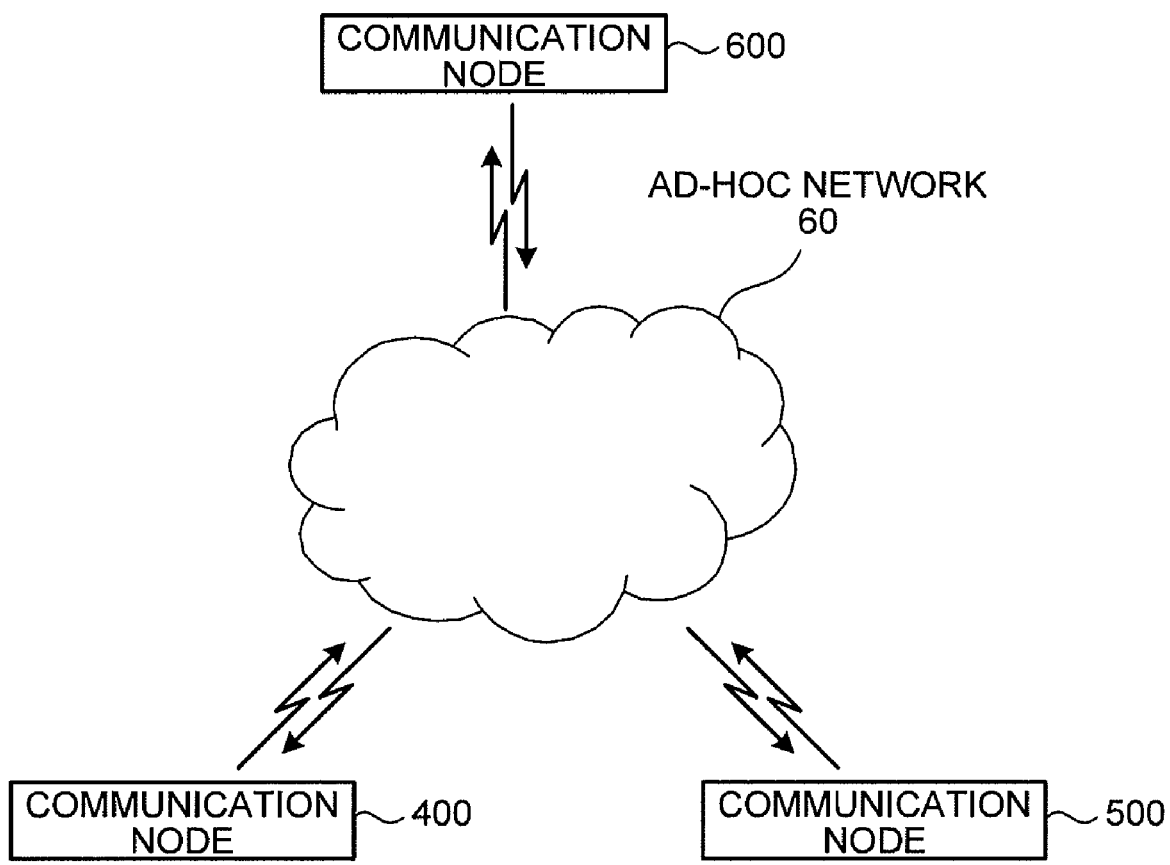
FIG. 8 is an example of contents of network management information stored in a communication node before being connected to the ad-hoc network.
FIG. 9 is a schematic diagram of an ad-hoc network according to a second embodiment of the present invention.

FIG. 8 is an example of contents of the network management information stored in the communication node 300 before being connected to the ad-hoc network. The address assigning unit 120b notifies the communication node 300 of the replacing IP address, and the MAC addresses and the IP addresses of the communication nodes constituting the ad-hoc network 50. The communication node 300 stores the network management information as shown in FIG. 8 before being connected to the ad-hoc network 50. Upon being notified of the above information, the communication node 300 updates the network management information as shown in FIG. 7 (step S104).

When the IP address included in the connection packet obtained from the communication node 300 is not used by any of the communication nodes that constitute the ad-hoc network 50, the address assigning unit 120b transmits the information (the MAC address and the IP address) of the newly added communication node (the communication node 300) to the communication nodes that constitute the ad-hoc network 50. The address assigning unit 120b notifies the communication node 300 of the MAC addresses and the IP addresses of the communication nodes that constitute the ad-hoc network 50.

As described above, according to the first embodiment, when the address assigning unit 120b receives a connection request to the ad-hoc network 50 from an external communication node (communication node that is not connected to the ad-hoc network 50), the communication node 100 obtains the information on the IP address assigned to the external communication node. Based on the network management information 130a stored in the storage unit 130, the communication node 100 determines whether the obtained IP address is already used by any of communication nodes that constitute the ad-hoc network 50. When determining that the IP address is already used, the communication node 100 generates a new IP address that is not used by none of the communication nodes. The communication node 100 transmits the IP address to the external communication node. Accordingly, the external communication node is assigned the IP address, and participates in the ad-hoc network. Thus, an IP address can be efficiently assigned to a communication node that newly participates in the ad-hoc network, which prevents duplicate use of the same IP address.

When the IP address of communication nodes that constitutes the ad-hoc network 50 is duplicated, the IP address of the communication nodes having the duplicated IP addresses is changed (e.g., when the IP address of the communication node 100 and the communication node 300 is duplicated, the IP address of both the communication nodes 100 and 300 is replaced with a new IP addresses). Therefore, a packet is prevented from being transmitted to an intended destination. When only the IP address of one of the communication nodes having the duplicated IP address is changed, data that has been transmitted to the communication node of which the address is changed is erroneously transmitted to a communication node having an unchanged address.

Explained below is the salient feature of a second embodiment of the present invention. The communication node 100 assigns IP addresses to the communication nodes while avoiding duplicate use of the same IP address by communication nodes that constitute the ad-hoc network 50. According to the second embodiment, a communication node assigns, in addition to IP addresses, uniform resource locators (URLs) to terminals of each communication node while preventing duplicate use of the same URL by terminals connected to a communication node and terminals connected to other communication nodes. A URL of a terminal connected to a communication node is hereinafter referred to as a terminal URL.

Specifically, the communication node retains, as the address management information, information on the IP addresses of communication nodes that constitute the ad-hoc network and information on terminal URLs. Upon receiving a connection request from another communication node, the communication node generates IP addresses and terminal URLs that are not duplicated with other communication nodes, based on the address management information. The communication node transmits the IP address and the terminal URL to the communication node that issues the connection request, thereby assigning the IP address and the terminal URL.

The communication node transmits the IP address and the terminal URL to the communication node that issues the connection request, thereby assigning the IP address and the terminal URL that are not duplicated with other communication nodes. Accordingly, the IP address and the terminal URL can be promptly assigned to the communication node. Thus, the communication node that is a source of the connection request can be efficiently connected to the ad-hoc network.

FIG. 9 is a schematic diagram of an ad-hoc network 60 according to the second embodiment. The ad-hoc network 60 includes communication nodes 400 to 600. Although three communication nodes (400 to 600) are shown for convenience of illustration, the ad-hoc network 60 can include an arbitrary number of communication nodes.

The communication nodes 400 to 600 perform data communication with one another. The communication nodes 400 to 600 are of like configuration and operate in a similar manner, and thus but one of them, for example, the communication node 400 is explained in detail below.

Figure 10:
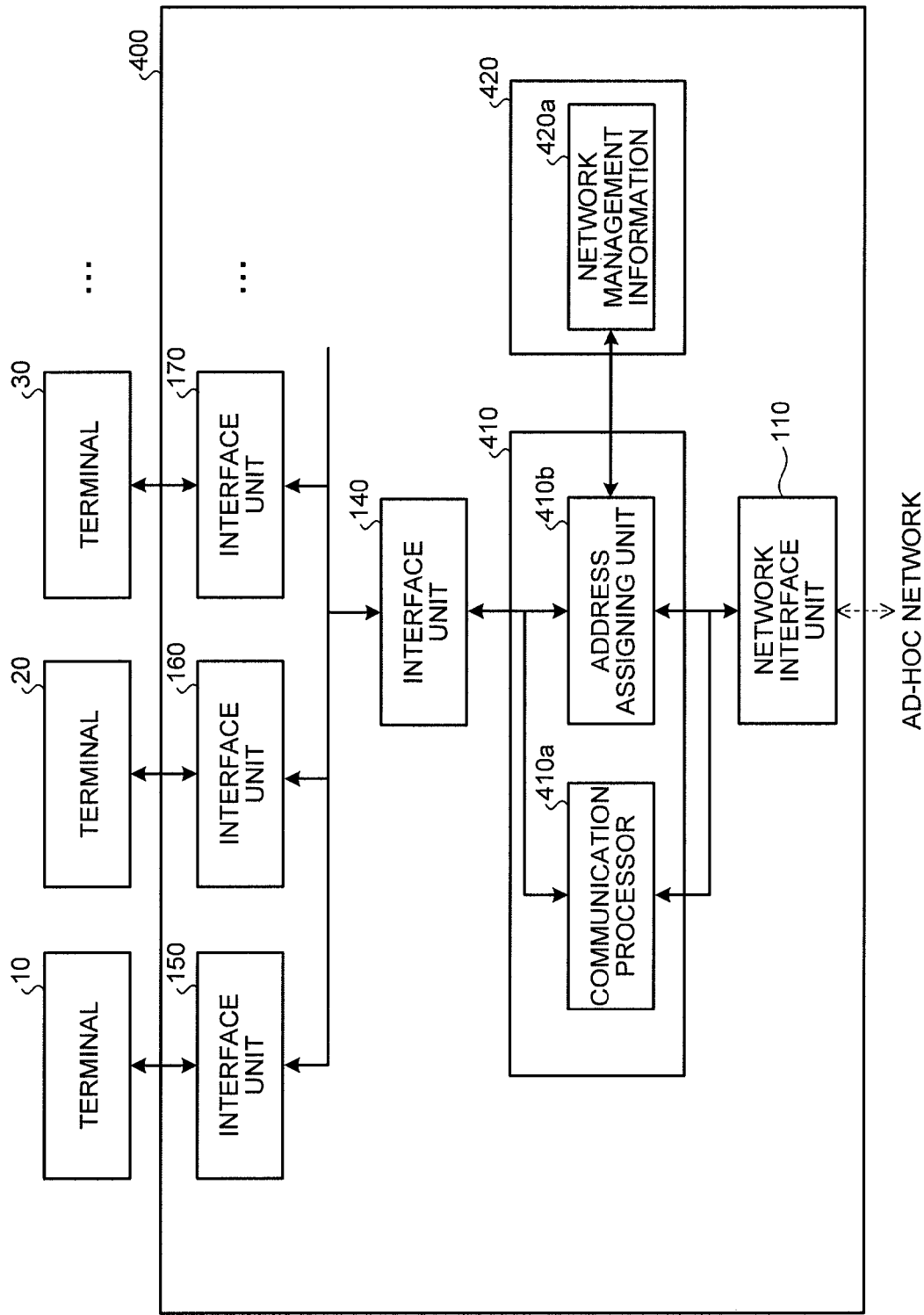
FIG. 10 is a functional block diagram of a communication node shown in FIG. 9.

FIG. 10 is a functional block diagram of the communication node 400. The communication node 400 is of basically the same configuration as the communication node 100 except for a controller 410 and a storage unit 420. Therefore, like reference numerals refer to corresponding components, and the same explanation is not repeated.

The controller 410 assigns an IP address and a terminal URL to each of the communication nodes that constitute the ad-hoc network 60 to prevent duplication of IP addresses and terminal URLs of the communication nodes. The controller 410 has a communication processor 410a and an address assigning unit 410b.

The communication processor 410a provides data communications among the terminals 10 to 30 connected to the interface units 150 to 170, and terminals connected to other communication nodes that constitute the ad-hoc network 60.

When receiving a connection request to the ad-hoc network 60 from another communication node (communication node that is not connected to the ad-hoc network 60), the address assigning unit 410b obtains an IP address and a terminal URL assigned to the communication node that issues the connection request. The address assigning unit 410b determines whether the obtained IP address and terminal URL are duplicated with any of IP addresses and terminal URLs assigned to the communication nodes that constitute the ad-hoc network 60, based on network management information 420a stored in the storage unit 420. When determining that the IP address or the terminal URL is duplicated, the address assigning unit 410b generates IP addresses or terminal URLs that are not duplicated with other communication nodes. The address assigning unit 410b transmits the new IP addresses or terminal URLs to the communication node that issues the connection request, and the communication nodes that constitute the ad-hoc network 60, thereby assigning the IP addresses and the terminal URLs.

Figure 11:
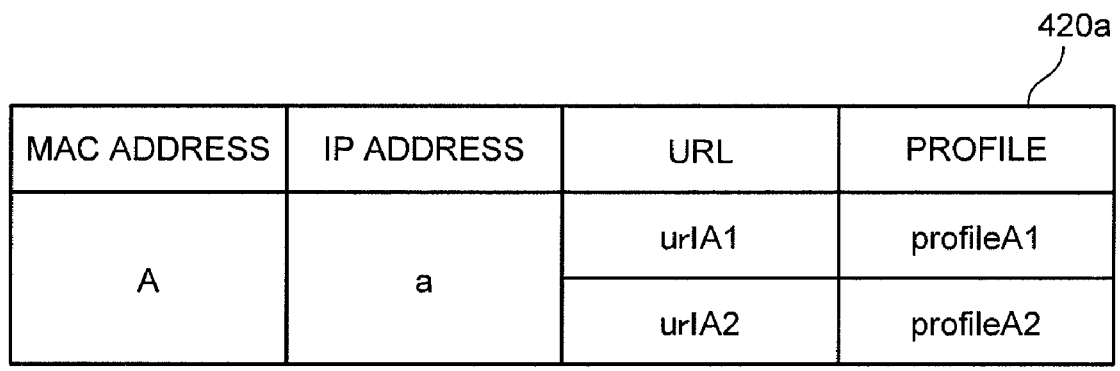
FIG. 11 is an example of contents of network management information shown in FIG. 10.

The storage unit 420 stores therein the network management information 420a. The network management information 420a includes information on the IP addresses assigned to the communication nodes that constitute the ad-hoc network 60, information of the MAC addresses of the communication nodes, the terminal URLs, and information associated with the terminal URLs. FIG. 11 is an example of contents of the network management information 420a.

As shown in FIG. 11, the network management information 420a includes items of MAC address, IP address, URL (terminal URL), and profile (it is assumed in FIG. 11 that the communication node 400 is connected to the ad-hoc network 60). In the profile, information for additionally explaining the terminal URL (e.g., a name of a terminal user, and an application name) is registered.

The address assigning unit 410b periodically generates a publication packet, and transmits the packet. The publication packet includes a packet ID for uniquely identifying the publication packet, and the network management information 420a.

The address assigning unit 410b substitutes the MAC address of the communication node 400 and information of a date and time when the publication packet is generated, for an arbitrary function (any function can be employed), to generate the packet ID. The address assigning unit 410b temporarily holds the generated packet ID, and successively updates the packet ID that is held (held packet ID) at each generation of a new packet ID.

When receiving a publication packet from another communication node that constitutes the ad-hoc network 60, the address assigning unit 410b compares the packet ID included in the received publication packet and the held packet ID. When the held packet ID is larger (held packet ID>packet ID obtained from the another communication node), the address assigning unit 410b updates the network management information 420a stored in the storage unit 420, based on network management information included in the publication packet received from the another communication node.

Processes relating to address assignment performed by the address assigning unit 410b are explained next. The processes assume that the communication node 400 constitutes the ad-hoc network 60, the communication node 600 is newly connected to the ad-hoc network 60, and the communication node 400 assigns the IP address and the terminal URLs to the communication node 600.

Figure 12:
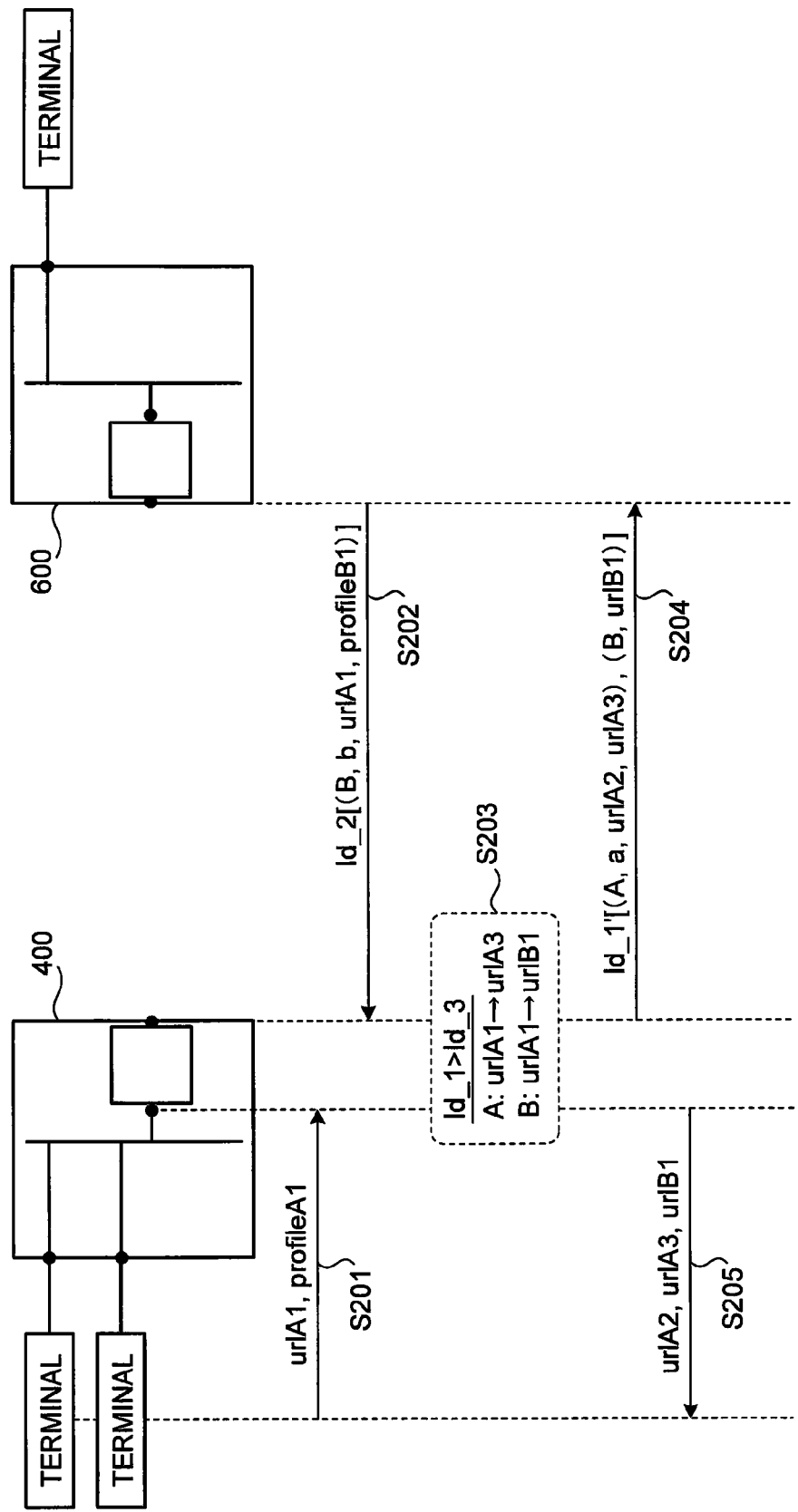
FIG. 12 is a sequence diagram of an address-assignment process performed by the communication node.

FIG. 12 is a sequence diagram of an address-assignment process performed by the communication node 400. As shown in FIG. 12, the communication node 400 obtains the information of the terminal URLs and the profiles from the terminals connected to the communication node 400, and registers the obtained information in the network management information 420a (step S201).

Figure 13:
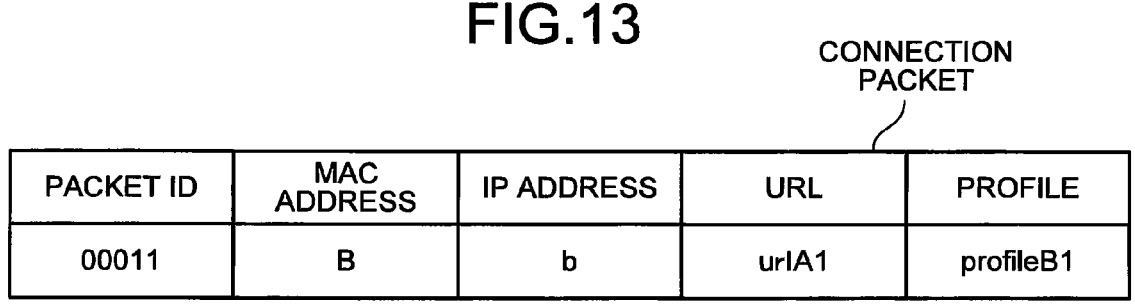
FIG. 13 is an example of a connection packet transmitted by a communication node to another communication node shown in FIG. 9.

The communication node 600 transmits a connection packet to the communication node 400 to join the ad-hoc network 60 (step S202). The connection packet transmitted by the communication node 600 includes the information of the packet ID, the MAC address, the IP address, the terminal URL, and the profile. FIG. 13 is an example of the connection packet transmitted from the communication node 600 to the communication node 400 at step S202.

Upon receipt of the connection packet from the communication node 600, the communication node 400 compares the packet ID included in the connection packet and the held packet ID. When the held packet ID is larger, the communication node 400 determines whether the IP address and the terminal URL are already used based on the network management information 420a and the connection packet.

In the network management information 420a shown in FIG. 11 and the connection packet shown in FIG. 13, a terminal URL "urlA1" of the MAC address "A" and the MAC address "B" is duplicated. Thus, the address assigning unit 410b replaces the URLs with other URLs (step S203). For example, the terminal URL "urlA1" of the MAC address "A" is replaced with "urlA3", and the terminal URL "urlA1" of the MAC address "B" is replaced with "urlB1".

Figure 14:
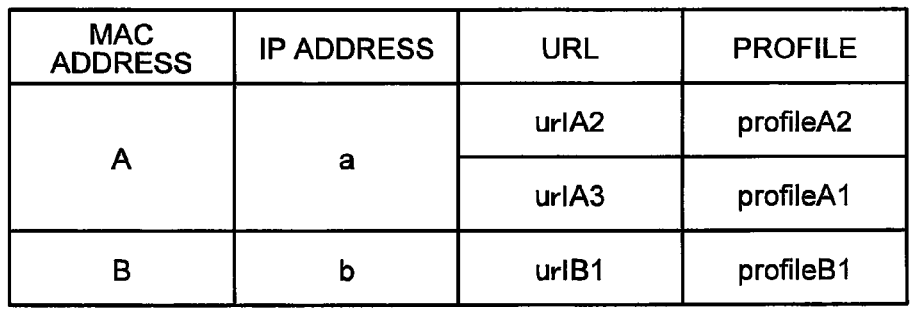
FIG. 14 is an example of contents of the network management information after information is updated/added.

The address assigning unit 410b updates the network management information 420a in response to replacement of the terminal URL, and adds the information of the MAC address, the IP address, the terminal URL, and the profile of the communication node 600 to the network management information 420a. FIG. 14 is an example of the network management information 420a after the information is updated/added.

In the network management information 420a shown in FIG. 14, as compared to that shown in FIG. 11, the terminal URL "urlA1" of the MAC address "A" is replaced with "urlA3", and the information of the MAC address, the IP address, the terminal URL, and the profile of the communication node 600 is added.

Figure 15:
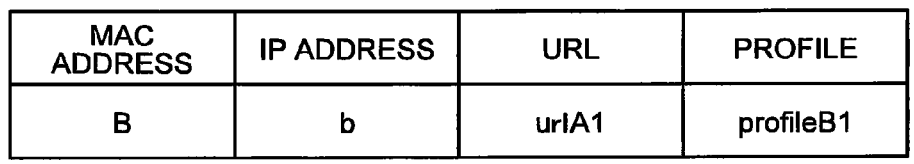
FIG. 15 is an example of contents of network management information stored in a communication node before being connected to the ad-hoc network.

FIG. 15 is an example of the network management information stored in the communication node 600 before the communication node 600 is connected to the ad-hoc network 60. The address assigning unit 410b notifies the communication node 600 of the replacing terminal URL, and the information (the MAC addresses, the IP addresses, the terminal URLs, and the profiles) of the communication nodes that constitute the ad-hoc network 60. The communication node 600 stores the network management information as shown in FIG. 15 before being connected to the ad-hoc network 60. Upon being notified of the above information, the communication node 600 updates the network management information as shown in FIG. 14 (step S204).

When the IP address included in the connection packet received from the communication node 600 is already used by any of the communication nodes that constitute the ad-hoc network 60, the address assigning unit 410b makes replacement of the IP addresses in the same manner as the address assigning unit 120b previously described in connection with FIG. 2, and transmits a replacing IP address to the communication node 600. Thus, the communication node 600 is assigned the IP address not used by other communication nodes.

As described above, when the address assigning unit 410b receives a connection request to the ad-hoc network 60 from an external communication node, the communication node 400 obtains the IP address and the terminal URL assigned to the external communication node. Based on the network management information 420a stored in the storage unit 420, the communication node 400 determines whether the obtained IP address and terminal URL are already used by any of communication nodes that are connected to the ad-hoc network 60. When determining that the IP address or the terminal URL is already used, the communication node 400 generates IP addresses or terminal URLs that are not used by the other communication nodes. The communication node 400 transmits the new IP address or terminal URL to the external communication node. Thus, the external communication node is assigned the new IP address or terminal URL. Accordingly, the communication node 400 can promptly assign URL, which is not duplicated, to a terminal to be connected to the ad-hoc network.

Explained below is the salient feature of a third embodiment of the present invention. According to the third embodiment, a communication node assigns a virtual address different from the real one and not duplicated among terminals under control of communication nodes that constitute an ad-hoc network. When a packet is transmitted from a terminal under control of the communication node to a terminal under control of another communication node, the communication node performs conversion between the real address and the virtual address to perform data communication.

When the virtual address and the real address are used in the data communication between communication nodes, a combination of the virtual address and the real address of the terminal is not changed even when the addresses of the communication nodes are changed. Accordingly, the data communication can be provided continuously after the address is changed.

Figure 16:
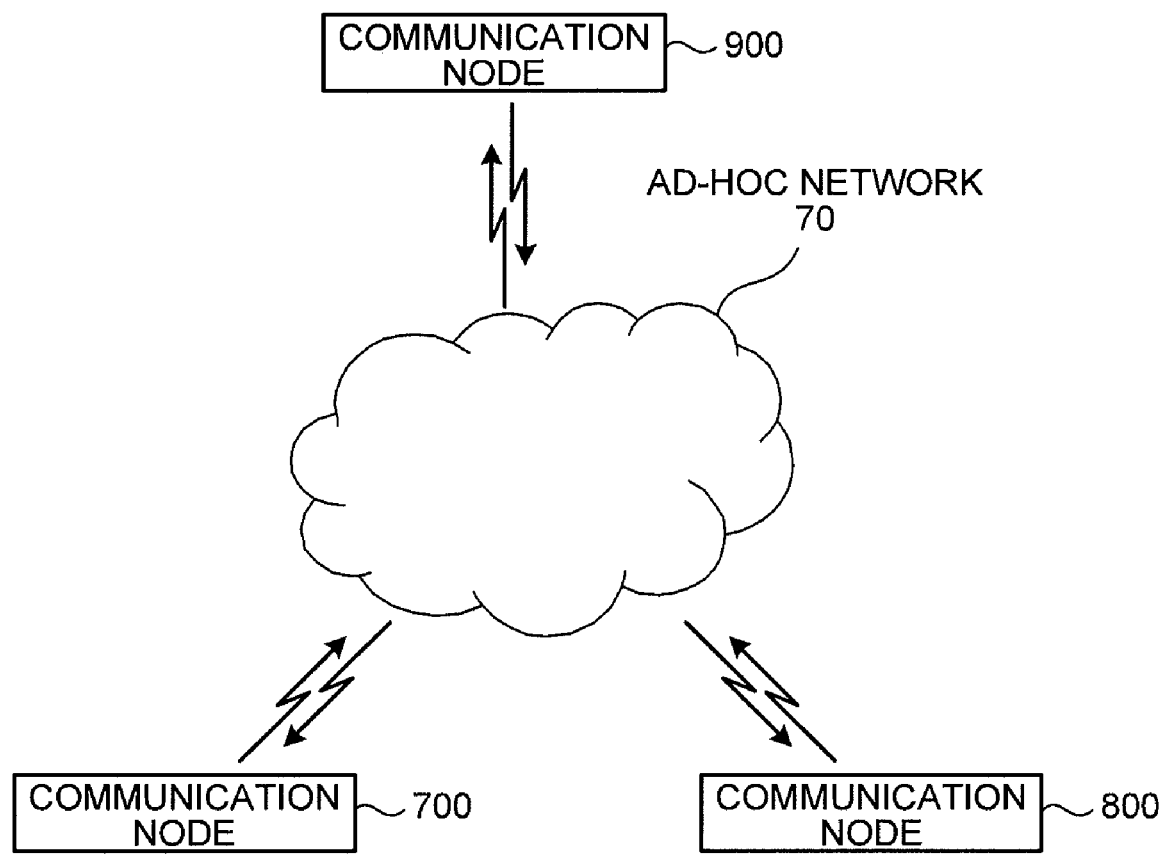
FIG. 16 is a schematic diagram of an ad-hoc network according to a third embodiment of the present invention.

FIG. 16 is a schematic diagram of an ad-hoc network 70 according to the third embodiment. The ad-hoc network 70 includes communication nodes 700 to 900. Although three communication nodes (700 to 900) are shown for convenience of illustration, the ad-hoc network 70 can include an arbitrary number of communication nodes.

The communication nodes 700 to 900 perform data communication with one another. The communication nodes 700 to 900 are of like configuration and operate in a similar manner, and thus but one of them, for example, the communication node 700 is explained in detail below.

Figure 17:
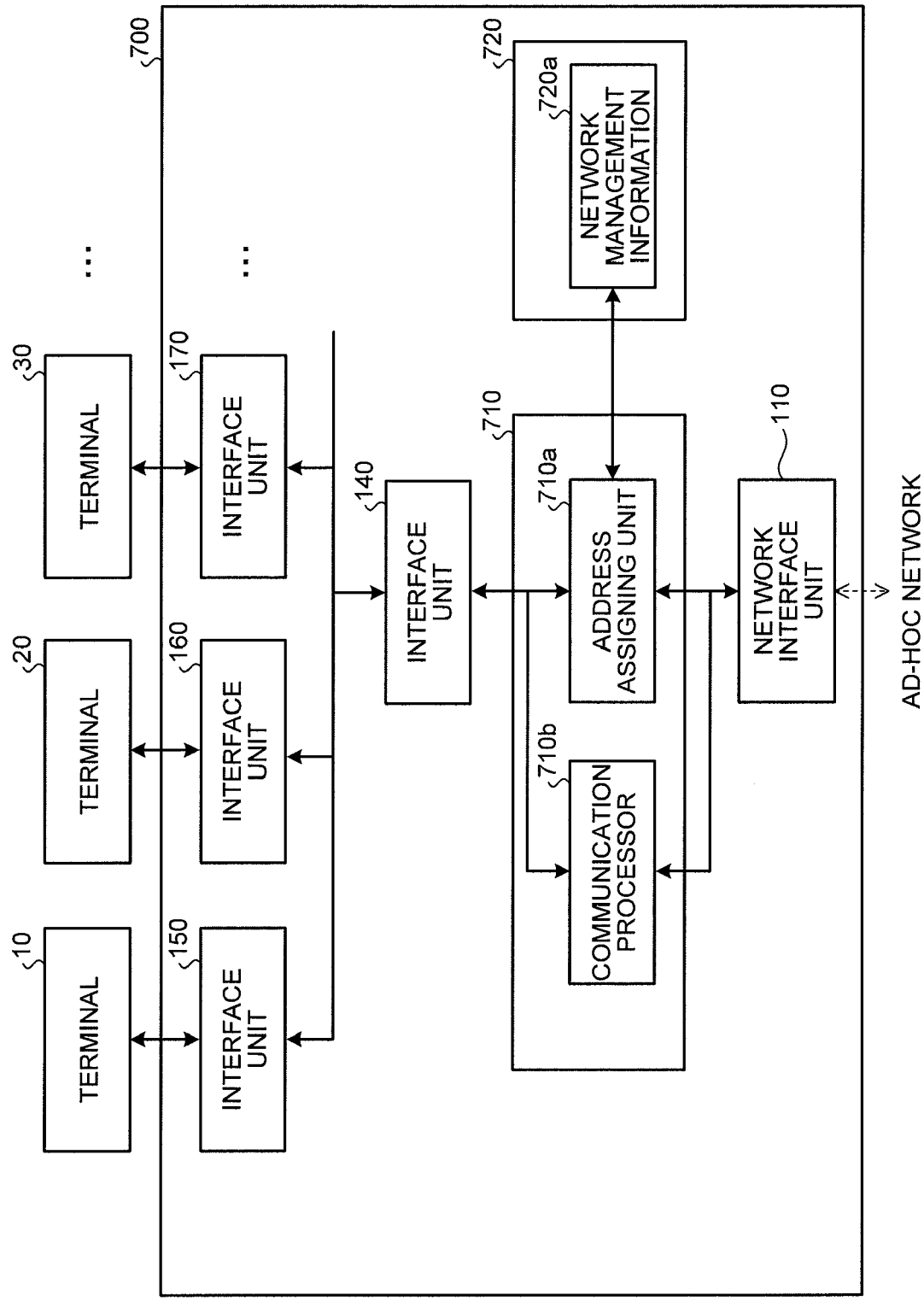
FIG. 17 is a functional block diagram of a communication node shown in FIG. 16.

FIG. 17 is a functional block diagram of the communication node 700. The communication node 700 is of basically the same configuration as the communication node 100 except for controller 710 and a storage unit 720. Therefore, like reference numerals refer to corresponding components, and the same explanation is not repeated.

The controller 710 assigns IP addresses and terminal URLs to the communication nodes that constitute the ad-hoc network 70 so that the IP addresses and the terminal URLs are not duplicated. The controller 710 assigns virtual addresses and real addresses, and transmits a gateway address (a terminal IP address of the communication node 700), to the terminals 10 to 30 connected to the interface units 150 to 170, respectively. The controller 710 includes an address assigning unit 710a and a communication processor 710b.

When receiving a connection request to the ad-hoc network 70 from another communication node (communication node that is not connected to the ad-hoc network 70), the address assigning unit 710a obtains an IP address and a terminal URL assigned to the communication node that issues the connection request. The address assigning unit 710a determines whether the obtained IP address and terminal URL are duplicated with any of IP addresses and terminal URLs assigned to the communication nodes that are connected to the ad-hoc network 70, based on network management information 720a stored in the storage unit 720. When determining that the IP address or the terminal URL is duplicated, the address assigning unit 710a generates IP addresses or terminals URL that are not duplicated with other communication nodes. The address assigning unit 710a transmits the new IP address or terminal URL to the communication node that issues the connection request, thereby assigning the IP address and the terminal URL.

The address assigning unit 710a assigns the real addresses and the virtual addresses and transmits the gateway address (the terminal IP address of the communication node 700), to the terminals 10 to 30 connected to the interface units 150 to 170.

The storage unit 720 stores therein the network management information 720a. The network management information 720a includes information on the IP addresses assigned to the communication nodes connected to the ad-hoc network 70, the MAC addresses of the communication nodes, the terminal URLs, the real addresses, and the virtual addresses. FIG. 18 is an example of contents of the network management information 720a.

As shown in FIG. 18, the network management information 720a includes items of MAC address, IP address, URL (terminal URL), real address, and virtual address (it is assumed in FIG. 18 that the communication nodes 700 and 800 are connected to the ad-hoc network 70). The real addresses are IP addresses assigned to the terminals, and the virtual addresses are virtually assigned to identify the terminals.

FIG. 19 is an example of contents of network management information shared with the communication nodes that constitute the ad-hoc network 70. FIG. 20 is an example of contents of network management information stored in the communication node 800. As shown in FIGS. 18 to 20, the communication nodes share the MAC addresses, the IP addresses, the URLs (terminal URLs), and the real addresses, while the virtual addresses that are uniquely determined by the communication nodes are assigned to the terminals.

Returning to the explanations of the address assigning unit 710a, the address assigning unit 710a periodically generates a publication packet and transmits the packet.

The publication packet includes a packet ID for uniquely identifying the publication packet, and the network management information 720a (except for the information of the virtual address).

The address assigning unit 710a substitutes the MAC address of the communication node 700 and information of the date and time when the publication packet is generates for an arbitrary function (any function can be employed), to generate the packet ID. The address assigning unit 710a temporarily holds the generated packet ID, and successively updates the packet ID that is held (held packet ID) at each generation of a new packet ID.

When receiving a publication packet from another communication node that constitutes the ad-hoc network 70, the address assigning unit 710a compares the packet ID included in the received publication packet and the held packet ID. When the held packet ID is larger (held packet ID>packet ID obtained from the another communication node), the address assigning unit 710a updates the network management information 720a stored in the storage unit 720 based on network management information included in the publication packet received from the another communication node.

The communication processor 710b performs conversion between the real address and the virtual address using the network management information 72, to provide data communications among the terminals 10 to 30 connected to the interface units 150 to 170 and terminals connected to other communication nodes that are connected to the ad-hoc network 70.

Processes performed by the communication node 700 are explained next. The processes assume that the communication node 700 constitutes the ad-hoc network 70, the communication node 800 is newly connected to the ad-hoc network 70, and the communication node 700 assigns the IP address and the terminal URL to the communication node 800. Communication processes performed by the communication nodes 700 and 800 after the IP address and the terminal URL are assigned to the communication node 800 are also explained.

Figure 21:
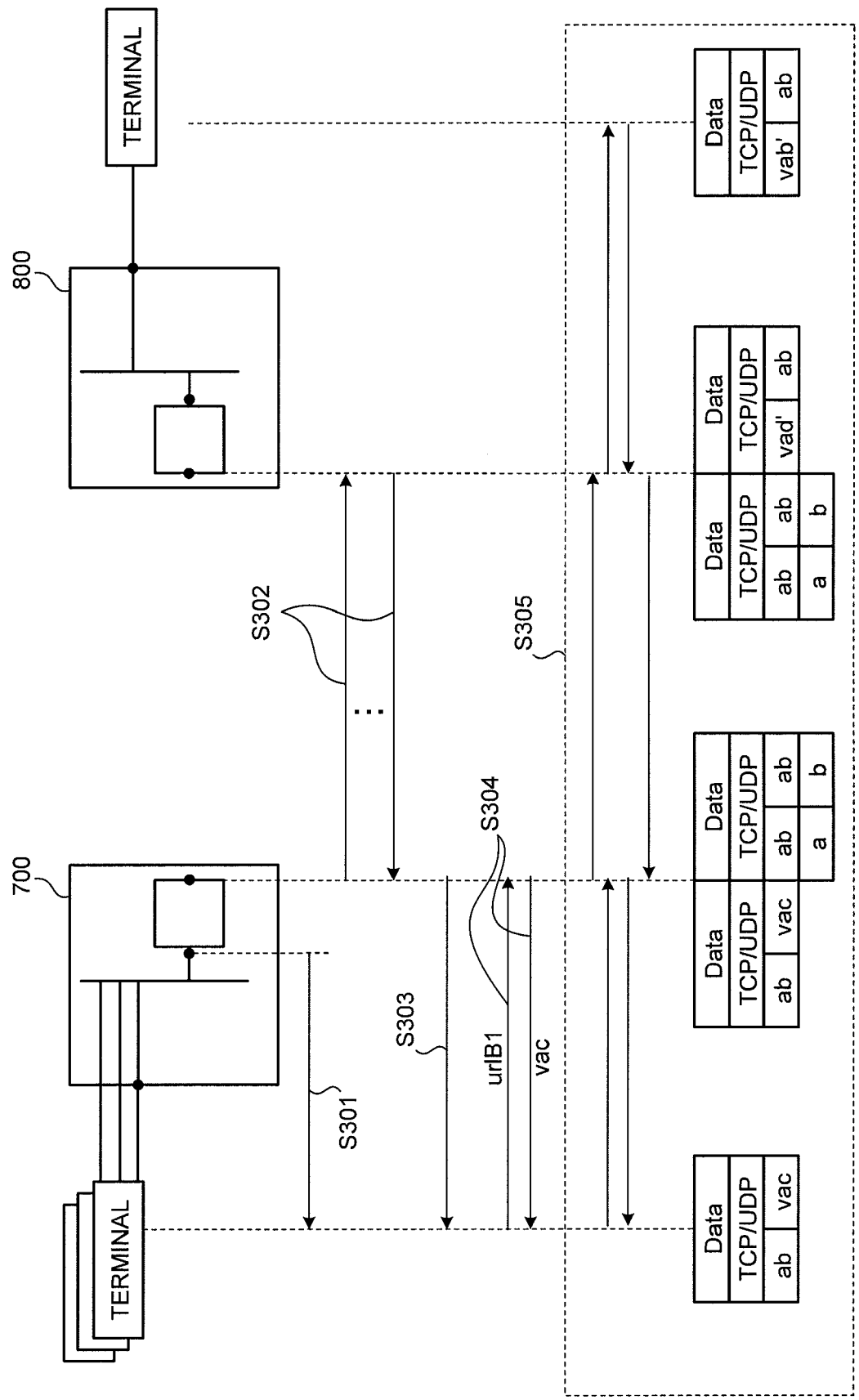
FIG. 21 is a sequence diagram of a process performed by the communication node shown in FIG. 16.

FIG. 21 is a sequence diagram of a process performed by the communication node 700. As shown in FIG. 21, in the communication node 700, the address assigning unit 710a transmits the gateway address (the terminal IP address of the communication node 700) and the real address to the terminals connected to the communication node 700, and registers the information of the assigned real address in the network management information 720a (step S301).

Upon receipt of a connection packet from the communication node 800, the communication node 700 eliminates duplication of the IP address or the terminal URL of the communication node that is connected to the ad-hoc network 70 (step S302). The process at step S302 is the same as previously described in connection with FIG. 12, and the same explanation is not repeated.

When the terminal URL is already used by a terminal connected to the communication node 800, the address assigning unit 710a generates different terminal URLs. The address assigning unit 710a transmits the generated terminal URLs to the corresponding terminals, and assigns the virtual addresses to the terminals 10 to 30 (step S303). After the above process, the communication node 700 retains the network management information 720a as shown in FIG. 18.

Next, when receiving information of the terminal URL as a destination from any one of the terminals 10 to 30 (e.g., the terminal 10), the communication processor 710b transmits the virtual address corresponding to the terminal URL to the terminal 10 (step S304). For example, when receiving the terminal URL "urlB1" from the terminal 10, the communication processor 710b transmits the virtual address "vac" to the terminal 10 based on the network management information 720a as shown in FIG. 18.

When receiving a packet to the virtual address from the terminal 10, the communication processor 710b converts the virtual address into the real address based on the network management information 720a. The communication processor 710b encapsulates the real address of the terminal 10 and the real address of the terminal under control of the communication node as the destination, using the IP address of the communication node 700 and the IP address of the communication node 800 as the destination. The communication processor 710b transmits the encapsulated packet (hereinafter, "communication packet") to the communication node 800.

Figure 22:
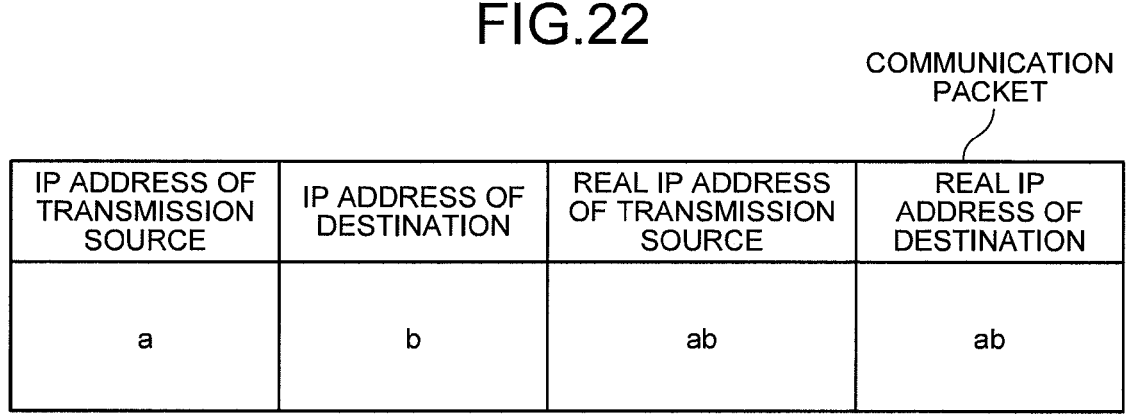
FIG. 22 is an example of data structure of a communication packet.

FIG. 22 is an example of data structure of the communication packet. As shown in FIG. 22, the communication packet includes an IP address of a transmission source, a real IP address of the transmission source, an IP address of a destination, and a real IP address of the destination. An IP address of a communication node as a transmission source is registered in the IP address of the transmission source, and a real address of a terminal as a transmission source is registered in the real IP address of the transmission source. An IP address of a communication node as a destination is registered in the IP address of the destination, and a real address of a terminal as a destination is registered in the real IP address of the destination.

When receiving the communication packet, the communication node 800 decapsulates the communication packet. The communication node 800 converts the real address of the terminal as the transmission source into the virtual address based on information stored in the communication packet and the network management information as shown in FIG. 20 (assuming that the communication node 800 retains the network management information as shown in FIG. 20).

A communication processor of the communication node 800 transmits the virtual address of the transmission source, data transmitted from the node of the transmission source, and the like, to a corresponding terminal based on the real address of the destination.

Figure 23:
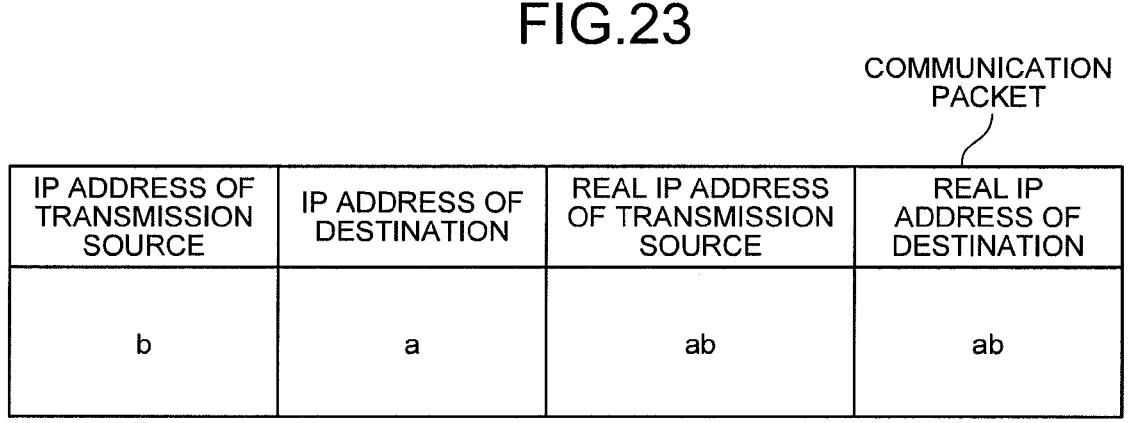
FIG. 23 is an example of a communication packet transferred by a communication node to another communication node shown in FIG. 16.

Next, when predetermined data is transferred from the terminal of the destination to the terminal of the transmission source, the terminal that has been the destination passes the data to the communication processor of the communication node 800 by setting the virtual address of the terminal that has been the transmission source to a transmission destination of the data. The communication processor converts the virtual address into the real address based on the network management information as shown in FIG. 20, and encapsulates the addresses to generate a communication packet. The communication processor transfers the generated communication packet to the communication node 700. FIG. 23 is an example of the communication packet transferred by the communication node 800 to the communication node 700.

When receiving the communication packet as shown in FIG. 23, the communication processor 710*b* of the communication node 700 transmits the virtual address of the transmission source, the data transmitted from the node as the transmission source, and the like, to a corresponding terminal (the terminal 10 in this example) based on the network management information 720*a*.

As described above, according to the third embodiment, the address assigning unit 710*a* assigns a real addresses and a virtual addresses to the terminals connected to the communication node 700. When data communication is established between different terminals, the communication processor 710*b* converts the virtual address into the real address to establish the data communication. Therefore, even when the IP address of a communication node connected to the ad-hoc network 70 is changed, the combination of the real address and the virtual address of a terminal connected to the communication node is not changed, and thus the data communication between terminals can be maintained.

The address assigning unit is explained above as hardware; however, it can be implemented as software. In other words, a computer program (hereinafter, "address-assignment program") can be executed on a computer to realize the same function as the address assigning unit. Similarly, a computer program (hereinafter, "communication processing program") can be executed on a computer to realize the same function as the communication processor. In the following, such a computer is explained with reference to FIG. 24.

Figure 24:
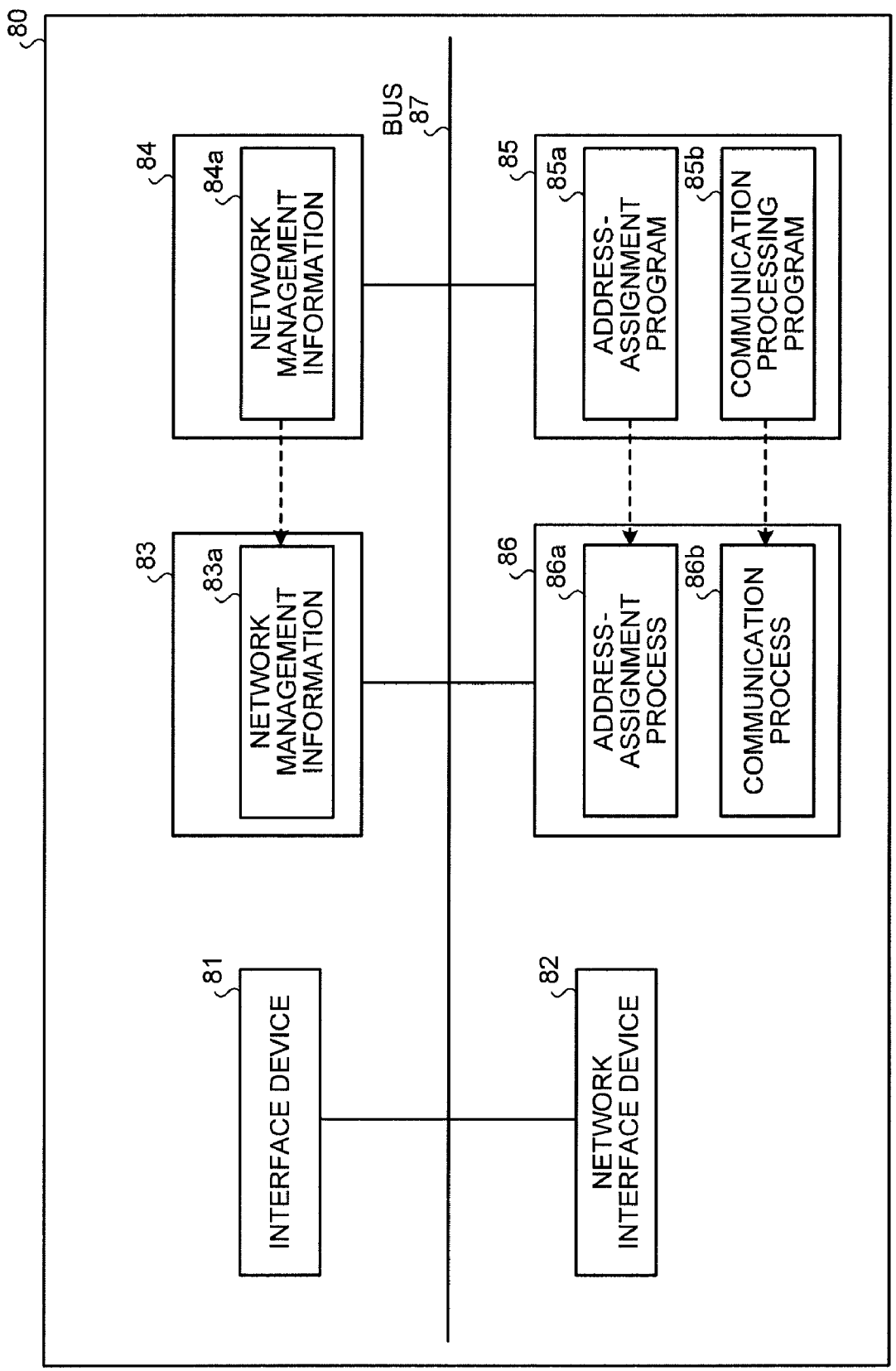
FIG. 24 is a schematic diagram of a computer that executes an address-assignment program.

FIG. 24 is a schematic diagram of a computer 80 that executes an address-assignment program 85*a* and a communication processing program 85*b*. The computer (communication node) 80 includes an interface device 81, a network interface device 82, a random access memory (RAM) 83, a hard disk drive (HDD) 84, a read only memory (ROM) 85, and a central processing unit (CPU) 86, which are connected via a bus 87. The interface device 81 is used to connect to a terminal. The network interface device 82 is used to connect to an ad-hoc network.

The ROM 85 previously stores therein computer programs, i.e., an address-assignment program 85*a* and the communication processing program 85*b*, that provide the same function as the communication node of the above embodiments.

The CPU 86 reads the programs 85*a* and 85*b* from the ROM 85 and executes them to implement an address-assignment process 86*a* and a communication process 86*b* as shown in FIG. 24. The address-assignment process 86*a* and the communication process 86*b* correspond to the address-assignment unit 120*b* (410*b*, 710*a*) and the communication processor 120*a* (410*a*, 710*b*), respectively.

Network management information 84*a* is stored in the HDD 84. The network management information 84*a* corresponds to the network management information 130*a*. The CPU 86 loads the network management information 84*a* stored in the HDD 84 into the RAM 83. The CPU 86 periodically transmits a publication packet to other communication nodes that are connected to the ad-hoc network. When a connection packet is obtained from another communication node, the CPU 86 assigns an IP address and a terminal URL that are not duplicated, to the communication node as the transmission source of the connection packet.

As set forth hereinabove, according to an embodiment of the present invention, an IP addresses can be efficiently assigned to a communication nodes, which prevents duplicate use of the same IP address.

Moreover, even when the addresses of communication nodes are changed due to duplicate use of the same address, data communication between the terminals under control of the communication nodes can be maintained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An address assignment apparatus that assigns an address to a communication node that constitutes an ad-hoc network, the address assignment apparatus comprising:

a storage unit that stores therein address management information indicating addresses assigned to existing communication nodes in the ad-hoc network;

a determining unit that, upon receipt of a request to connect to the ad-hoc network from an external communication node, obtains information on an address assigned to the external communication node, and determines whether the address is already used by any of the existing communication nodes based on the address management information;

an assignment unit that, when the address is already used, generates a first new address not used by the existing communication nodes, and assigns the first new address to the external communication node, and that, when the address is used by none of the existing communication nodes, receives the address assigned to the external communication node from the assignment unit, and transmits information on the address assigned to the external communication node to the existing communication nodes; and a communication processor that assigns a real address and a virtual address to a first terminal connected to one of communication nodes connected to the ad-hoc network, the virtual address uniquely identifying the first terminal, and, upon receipt from the first terminal of a request to connect to a second terminal connected to another one of the communication nodes, converts the virtual address to the real address to establish communication between the first terminal and the second terminal.

2. The address assignment apparatus according to claim 1, further comprising:

an update unit that receives a first new address generated by the assignment unit and updates an address management information stored in the storage unit based on the first new address received, and the address management information including address information assigned to the communication node ; and a transmitting unit that transmits the update address management information to communication nodes connected to the ad-hoc network.

3. The address assignment apparatus according to claim 1, wherein, when the address is already used by any of the existing communication nodes, the assignment unit generates a second new address not used by other communication nodes and different from the first new address, and assigns the second new address to the existing communication node.

4. The address assignment apparatus according to claim 1, wherein
the address management information includes first identification information for identifying a terminal connected to each of the existing communication nodes,
the determining unit obtains second identification information of a terminal connected to the external communication node, and determines whether the second identification information is identical with any of the first identification information based on the address management information, and
when the second identification information is identical with any of the first identification information, the assignment unit generates new identification information that is identical with none of the first identification information, and notifies the external communication node of the new identification information.

5. An address assignment method for assigning an address to a communication node that constitutes an ad-hoc network, the address assignment method comprising:
storing address management information indicating addresses assigned to existing communication nodes in the ad-hoc network;
obtaining, upon receipt of a request to connect the ad-hoc network from an external communication node, information on an address assigned to the external communication node;
determining whether the address is already used by any of the existing communication nodes based on the address management information;
generating, when the address is already used, a new address not used by the existing communication nodes;
assigning the new address to the external communication node;
receiving, when the address is used by none of the existing communication nodes, the address assigned to the external communication node;
transmitting information on the address assigned to the external communication node to the existing communication nodes;
assigning a real address and a virtual address to a first terminal connected to one of the communication nodes connected to the ad-hoc network, the virtual address uniquely identifying the first terminal; and
converting, upon receipt from the first terminal of a request to connect to a second terminal connected to another one of the communication nodes, the virtual address to the real address to establish communication between the first terminal and the second terminal.

6. A computer-readable non-transitory recording medium that stores therein a computer program for assigning an address to a communication node that constitutes an ad-hoc network, the computer program causing a computer to execute:
storing address management information indicating addresses assigned to existing communication nodes in the ad-hoc network;
obtaining, upon receipt of a request to connect the ad-hoc network from an external communication node, information on an address assigned to the external communication node;
determining whether the address is already used by any of the existing communication nodes based on the address management information;
generating, when the address is already used, a new address not used by the existing communication nodes;
assigning the new address to the external communication node;
receiving, when the address is used by none of the existing communication nodes, the address assigned to the external communication node;
transmitting information on the address assigned to the external communication node to the existing communication nodes;
assigning a real address and a virtual address to a first terminal connected to one of the communication nodes connected to the ad-hoc network, the virtual address uniquely identifying the first terminal; and
converting, upon receipt from the first terminal of a request to connect to a second terminal connected to another one of the communication nodes, the virtual address to the real address to establish communication between the first terminal and the second terminal.

* * * * *